United States Patent [19]
DeMatties

[11] Patent Number: 6,006,469
[45] Date of Patent: Dec. 28, 1999

[54] MODULAR INTERLOCKING SHRUB SHELTER AND METHOD OF ASSEMBLY

[76] Inventor: Irving E. DeMatties, 219 Palmer Ave., Corinth, N.Y. 12822-1213

[21] Appl. No.: 09/129,804

[22] Filed: Aug. 6, 1998

Related U.S. Application Data
[60] Provisional application No. 60/082,816, Apr. 23, 1998.

[51] Int. Cl.⁶ .......................... A01G 13/00; A01G 17/06; A01B 79/00
[52] U.S. Cl. ................................ 47/28.1; 47/44; 47/58.1
[58] Field of Search ................................ 47/21, 26, 28.1, 47/44, 45, 46, 47, 58.1; 256/1, 26; 135/139, 140; 182/67.4, 69.4, 92, 95, 182.2, 182.4, 186.5, 207, 153, 104

[56] References Cited

U.S. PATENT DOCUMENTS

| | | | |
|---|---|---|---|
| 11,153 | 6/1854 | Cross | 47/44 |
| 140,127 | 6/1873 | Fitzgerald | 47/28.1 |
| 473,128 | 4/1892 | Rankin, Jr. | 47/26 |
| 650,024 | 5/1900 | Riggins | 47/28.1 |
| 680,507 | 8/1901 | Thomas | 256/1 |
| 775,683 | 11/1904 | Seelhorst, Jr. | 47/44 |
| 1,510,461 | 10/1924 | Cordes | 182/104 |
| 1,628,249 | 5/1927 | Kirfman | 47/44 |
| 3,830,340 | 8/1974 | Schaffel | 182/226 |
| 3,846,935 | 11/1974 | Wagner | |
| 3,878,643 | 4/1975 | Greenman et al. | |
| 4,197,673 | 4/1980 | Thomas | |
| 4,974,815 | 12/1990 | Glass | 256/64 |
| 5,222,325 | 6/1993 | Angus | |
| 5,577,574 | 11/1996 | Joseph | 182/180 |

FOREIGN PATENT DOCUMENTS

| | | | |
|---|---|---|---|
| 2569522 | 3/1986 | France | 47/28.1 |
| 2569942 | 3/1986 | France | 47/26 |
| 2194873 | 3/1988 | United Kingdom | 47/28.1 R |
| WO 86/04210 | 7/1986 | WIPO | 47/28.1 C |

*Primary Examiner*—Thomas Price
*Assistant Examiner*—Fredrick T. French, III
*Attorney, Agent, or Firm*—Jay R. Yablon

[57] ABSTRACT

A shrub shelter assembled from modular, interlocking components forms an inverted-V-shaped device to protect shrubs, bushes, small trees and other plants from the damaging effects of falling ice and snow. The assembly of the preferred embodiment utilizes a modular hinge assembly connecting a front framework panel to a rear framework panel. The framework panels are themselves assembled from modular legs, modular horizontal slats, and optional modular vertical slats. Leg extenders enable the height of the shelter to be easily varied, and leg anchors are used to firmly attach the shelter to the ground. Assembly is very simple and fast, and requires no tools.

30 Claims, 6 Drawing Sheets

MODULAR INTERLOCKING SHRUB SHELTER AND METHOD OF ASSEMBLY

CROSS-REFERENCE TO RELATED APPLICATIONS

This application claims the benefit of U.S. provisional application Ser. No. 60/082,816, filed Apr. 23, 1998.

FIELD OF THE INVENTION

The present invention relates in general to plant protection devices and in particular to hingedly connected framework panels of interlocking modular components to protect shrubs, plants, small trees and the like from the damaging effects of falling ice and snow.

BACKGROUND OF THE INVENTION

Different methods and devices have been used in the past to protect plants, shrubs and trees from damage by falling ice and snow, especially under the eaves of buildings. Some methods have involved binding plant branches with twine and securing a covering of burlap or other mesh-like material around the plant. The use of wire or tubular frameworks and similar mesh-like coverings have also been employed, but all such methods have been marginally successful, at best, and are unsightly in appearance.

Prior devices that provide adequate protection for such plants, shrubs and trees are lacking in one or more of the following attributes: durability and attractiveness, ease of assembly and disassembly, portability and storability, adaptability to various plant heights and shapes, and economic manufacture of a device to permit simple user assembly, without the use of separate parts or fasteners, and a reasonable consumer investment.

Wooden shrub protectors have also been used in colder climate regions, but they are expensive to fabricate, are time and labor intensive in their assembly, and are difficult and expensive to maintain from the deteriorating effects of weather. Other known protection devices offer a solution to some of the above lacking attributes, but not all. For example: the "Shrub Protector" of Greenman and Pelky U.S. Pat. No. 3,878,643 has advantages of being portable and inexpensive but employs outdated technology using wooden slats as supporting side members. The slats must be procured separately, time-consumingly fitted with several pieces of hardware and fasteners, and are subject to deterioration from weather conditions. Storability, upon disassembly, may also be problematic without the use of separate containers to hold its various parts.

Similarly, the "Plant, Shrub and Tree Protector Garden Panel" of Thomas U.S. Pat. No. 4,197,673 requires several parts and fasteners as well as considerable set-up time in its initial assembly and reconfiguration. The height adjustment feature is quite limited by the fixed lengths of the sheet-like plates and is an added initial cost to consumers who may not need this at all, or perhaps for a considerable length of time.

The "Shrub Protector" of Wagner U.S. Pat. No. 3,846,935 incorporates a feature to adjust its legs to irregular land conformation surrounding a shrub, but does little to provide continuing protection for shrubs or trees which may grow beyond its overall height. Additionally, the device may now be cost prohibitive, being constructed of aluminum, stainless steel and other such materials, especially in light of technological advances in the use of high-impact plastics, extruded polyvinyl and the like.

Whatever the advantages, features and benefits of the references cited above, none of the devices completely overcome difficulties associated with prior art devices nor satisfies the purposes of the interlocking shrub shelter of the present invention.

OBJECTS OF THE INVENTION

A primary object and major advantage of the present invention is to provide a device for sheltering shrubs, plants and small trees from the damaging effects of falling ice and snow which comprises similar modular components, with integrallymanufactured interlocking mechanisms, to permit simple assembly of the shrub shelter without the need or use of any separate parts or fasteners, whatsoever.

Another object of the present invention is to provide a device of strong and durable construction, requiring little or no maintenance to preserve a near-original appearance, which is lightweight and functional in form and in manufacture to allow ease of portability and convenient space-saving storage when not in use.

Yet another object of the present invention is to provide a device that incorporates a height extension feature and mechanism, to accommodate substantial growth of shrubs or trees, by means of connecting optional framework panels to existing framework panels. Unlike some related plant protection devices which incorporate height extension components in their initial configuration, at the expense of consumers who may never need or use them, the present invention merely provides the means for height extenders to be added, with a modest consumer expense incurred when, and if, needed.

A further and most significant object of the present invention is the use of substantially-identical modular components, as a practical means of reducing production costs and to provide greater consumer choices among shelter size, style and color. These features allow users to selectively obtain an aesthetically pleasing product, best suited to their particular need, and to coordinate or contrast colors of the interlocking shrub shelter of the present invention with colors of exterior shutters, siding and trimwork of nearby buildings, thus enhancing property appearance and value. The use of components of similar sizes and shapes, in conjunction with a unique and useful assembly system of integrated interlocking mechanisms, lends itself particularly well to pre-assembly, packaging and marketing of the present invention in a ready-to-use form at modest cost and greater convenience to consumers.

SUMMARY OF THE INVENTION

The present invention is a shrub and plant sheltering device of modular construction. It comprises a front framework panel and an opposing rear framework panel assembled from a plurality of leg and slat members, a hinge assembly, a pair of latch arms, a set of ground stakes, and optional framework extender panels also having leg and slat members. All components may be connected to one another without the use of any separate parts or fasteners.

The front and rear framework panels are connected by a hinge, at the apex of the shelter, to form an inverted v-shaped structure which provides full protection for a shrub, plant or tree by deflecting falling ice or snow.

The pair of adjustable latch arms are connected with leg members, on each side of the framework panels, to maintain the desired open-position distance between the two panels and to further strengthen and stabilize the entire structure.

Two optional framework extender panels are also assembled from a plurality of leg and slat members. Those panels are simply an extension of the front and rear primary panels and are easily connected to them to extend the overall height of the shelter.

The four ground stakes may be used, if desired, to secure the framework legs or extender legs to the ground to prevent accidental toppling of the shelter.

All leg and slat components of the interlocking shrub shelter are substantially identical to one another in their basic shape and peripheral dimensions. These components would be fabricated in different lengths to permit assembly of the shrub shelter in several heights and in different style configurations. All components would be manufactured in a variety of colors and embossed with a simulated woodgrain or other pattern to closely assimilate characteristics commonly found in exterior vinyl shutters and in exterior millwork products.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT OF THE INVENTION

The interlocking shrub shelter of the present invention is of modular construction comprising the following components: (A) vertical legs; (B) vertical slats; (C) vertical leg/slat extenders; (D) horizontal slats; (E) flexible hinge assembly; (F) latch arms; and (G) ground stakes.

Figure 8:
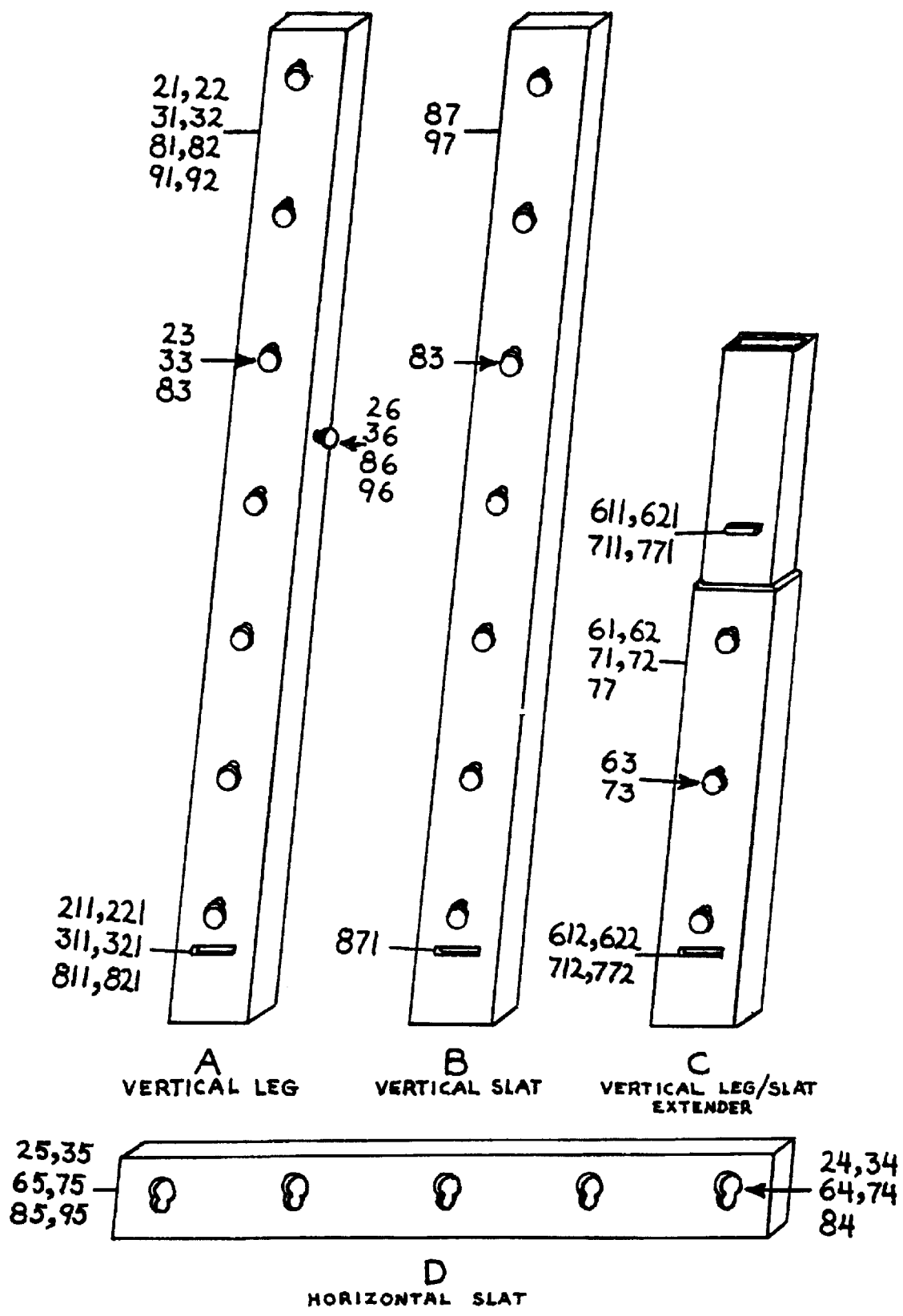
FIG. 8 is a perspective view of the four leg and slat components which are used, as a plurality of such members, to assemble the various framework panels shown in the several views of the drawing. Multiple reference numbers, associated with each component, merely indicate the different framework panels in which they may be found and correspond to the reference numbers used to describe each component, its location and method of assembly.

A plurality of the above four leg and slat components, as seen in FIG. 8, are the only members required to assemble the framework panels which form the bulk of the shrub shelter's protective structure. The hinge assembly, latch arms and ground stakes are used to connect, position, strengthen, and stabilize the framework panels.

Figures 2, 2A:
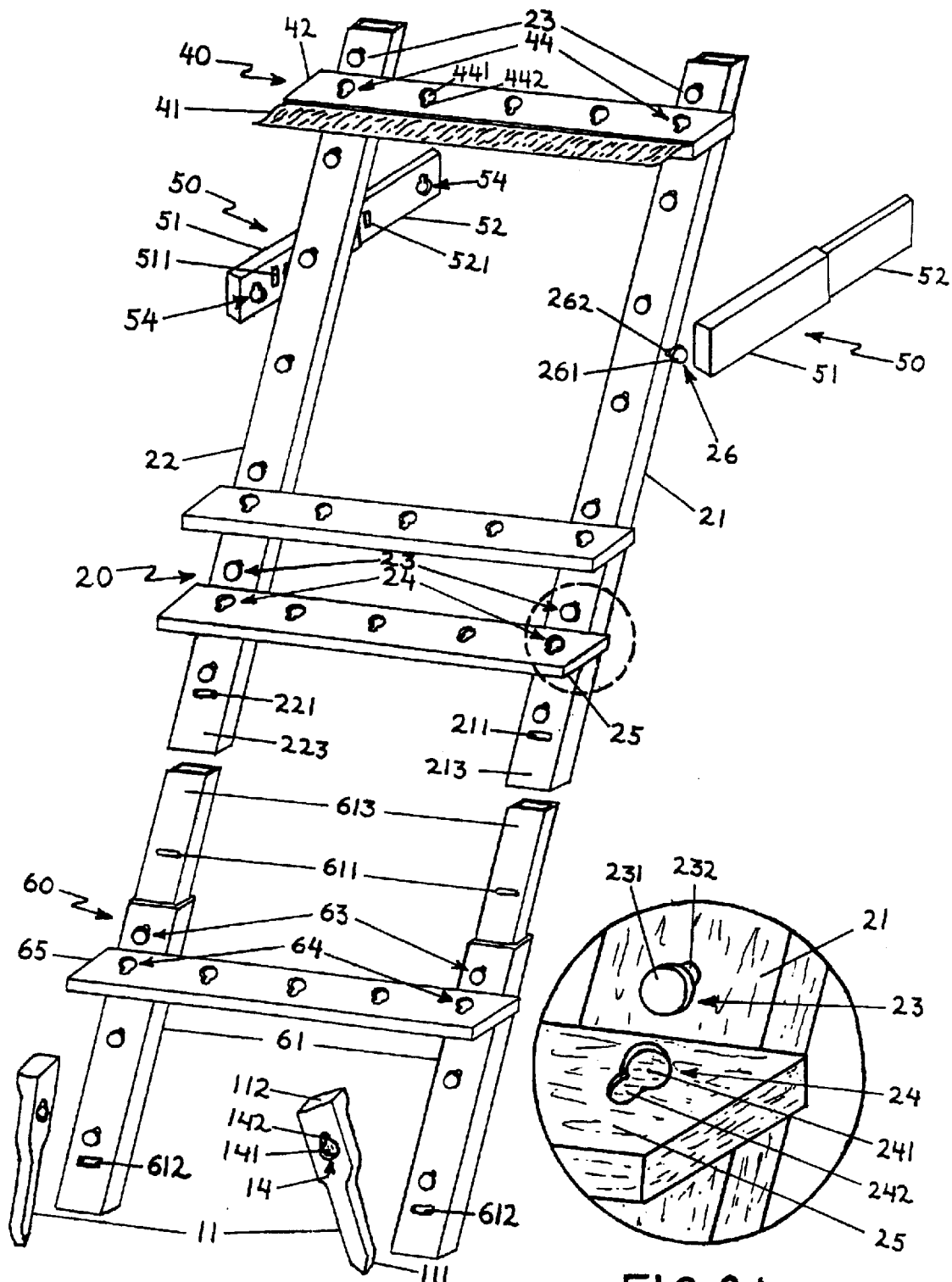
FIG. 2 is a perspective view of the rear portion of the o shrub shelter of FIG. 1, shown with an optional framework extender panel, with all modular components in their unassembled positions for reference to their various parts and interlocking mechanisms.
FIG. 2A is a supplementary view of FIG. 2 showing an enlarged portion of a leg and slat to better illustrate elements of their corresponding keypins and keyholes.
Figure 3:
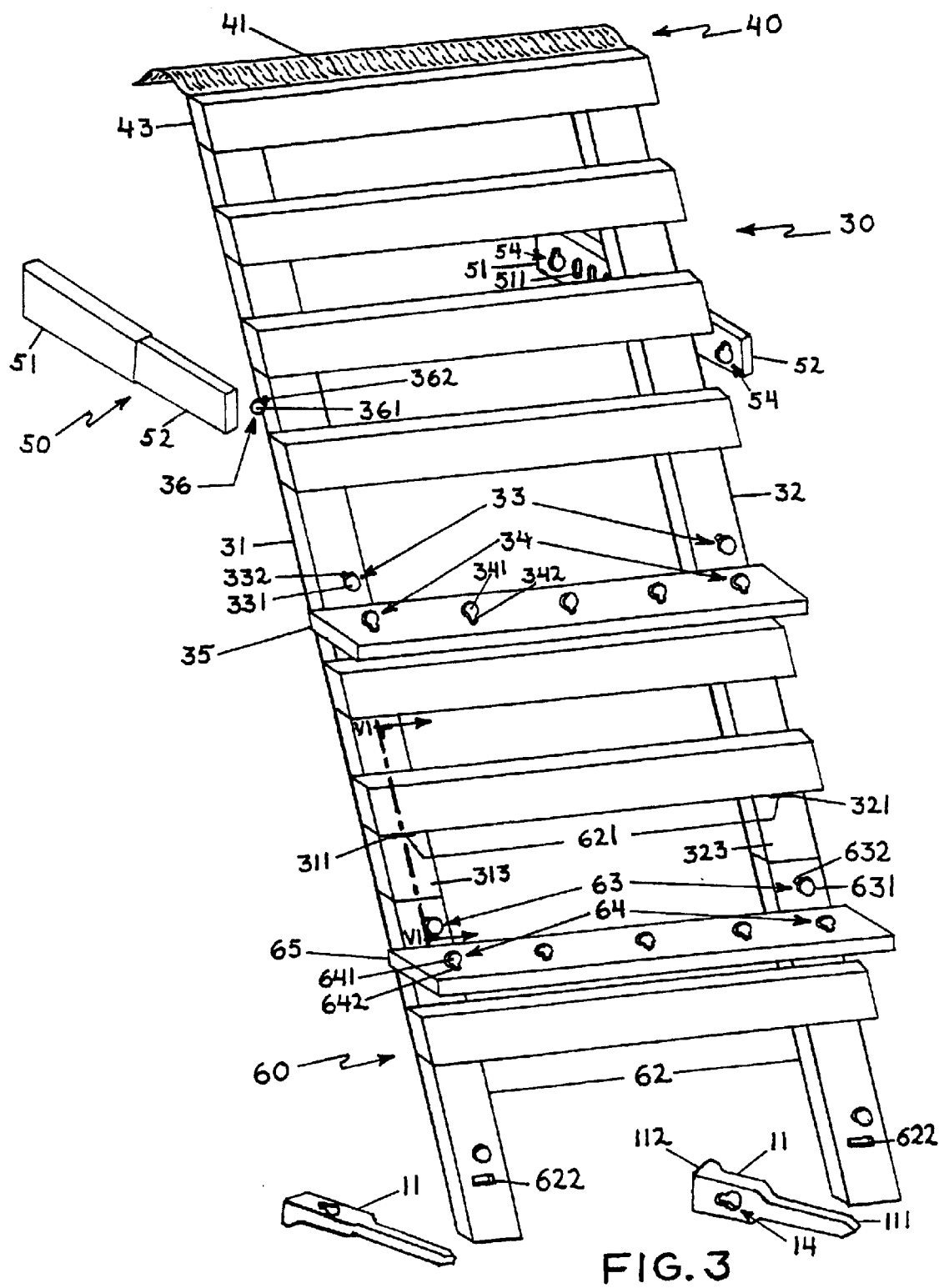
FIG. 3 is a perspective view of the front portion of the shrub shelter of FIG. 1, with an attached framework extender panel, showing a partial assembly of components to illustrate their connection to one another by reference to their interlocking mechanisms.
Figure 7:
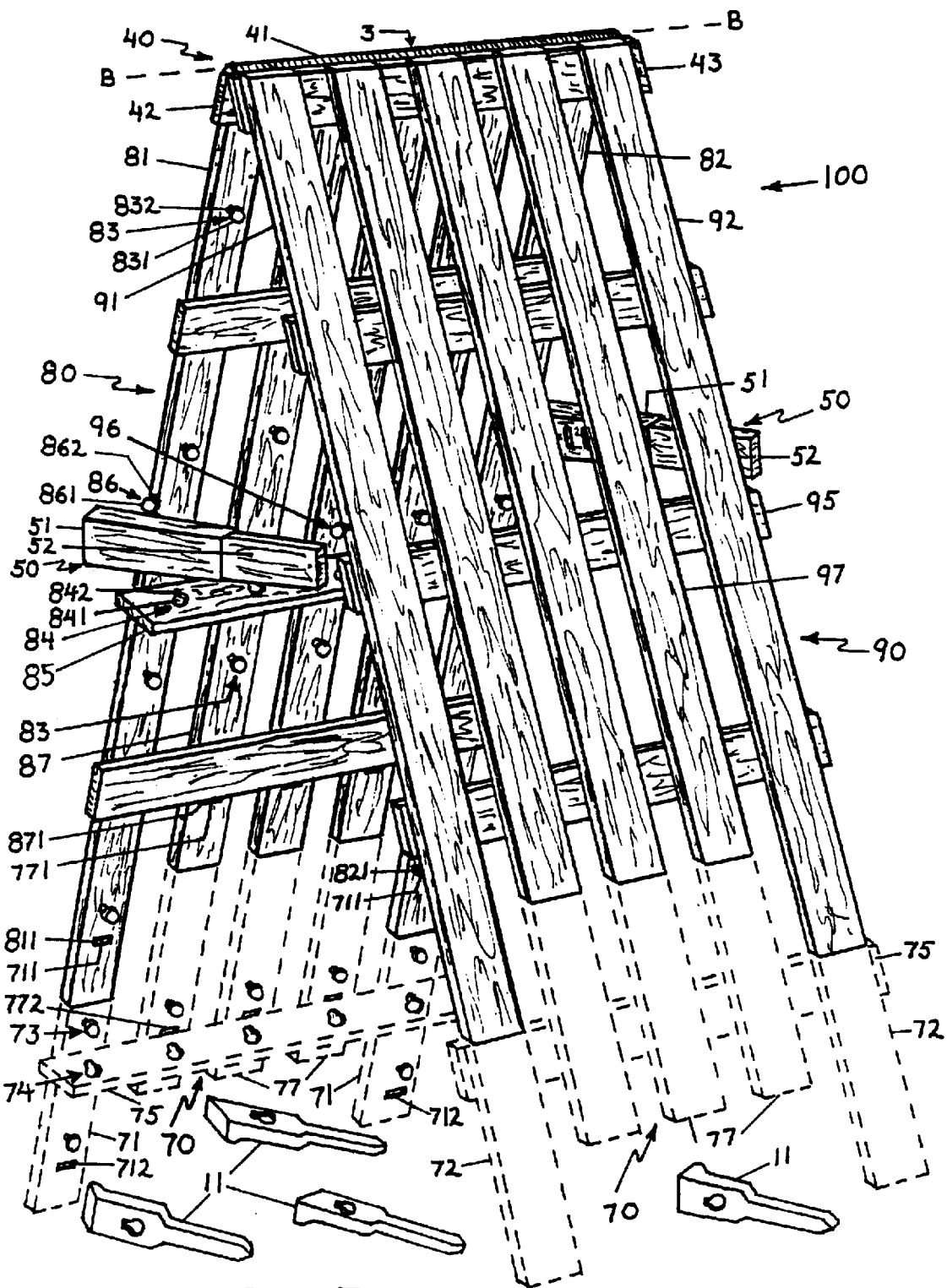
FIG. 7 is a perspective view of an alternate embodiment of the present invention showing its hingedly connected framework panels, configured with vertical legs and vertical slat members connected with horizontal slats, its adjustable latch arms, a set of ground stakes and its optional framework extender panels, as they would appear if connected to the existing framework panels, with some components unassembled for reference to their interlocking mechanisms.

It should be noted that the reference numbering system used herein employs different numbers to identify a plurality of substantially-identical leg and slat members, differentiated from one another solely by virtue of the particular framework panel in which they are found. For example: rear framework panel 20 D (FIGS. 1 and 2) is assembled with substantially-identical left and right legs 21, 22 and a plurality of substantially-identical horizontal slats 25; whereas, front framework panel 30 (FIGS. 1 and 3) is assembled with corresponding left and right legs 31, 32 substantially identical to each other and to legs 21, 22, and a plurality of slats 35 substantially identical to one another and to slats 25; similarly for the plurality of leg and slat components which are used to assemble framework panels 80, 90 (FIG. 7) and framework extender panels 60, 70 (FIGS. 2, 3 and 7).

Such multiple references may give the impression that there are more components than those which actually comprise the shelter. This numbering system has been used, however, to facilitate a better understanding of the manner in which a few, substantially-identical components are used to assemble several different framework panels and to more adequately describe their corresponding relationship and connection to one another. It is the use of a very small number of distinct modular components to create a wide range of shelter configurations that is a primary object and benefit of this invention.

For this reason, FIG. 8 is primarily intended to consolidate the above four leg and slat components (A, B, C and D) with their interlocking mechanisms in order to depict the various reference numbers which correspond to the different framework panels in which they are located, as will become apparent in the following detailed description of the present invention.

Figure 1:
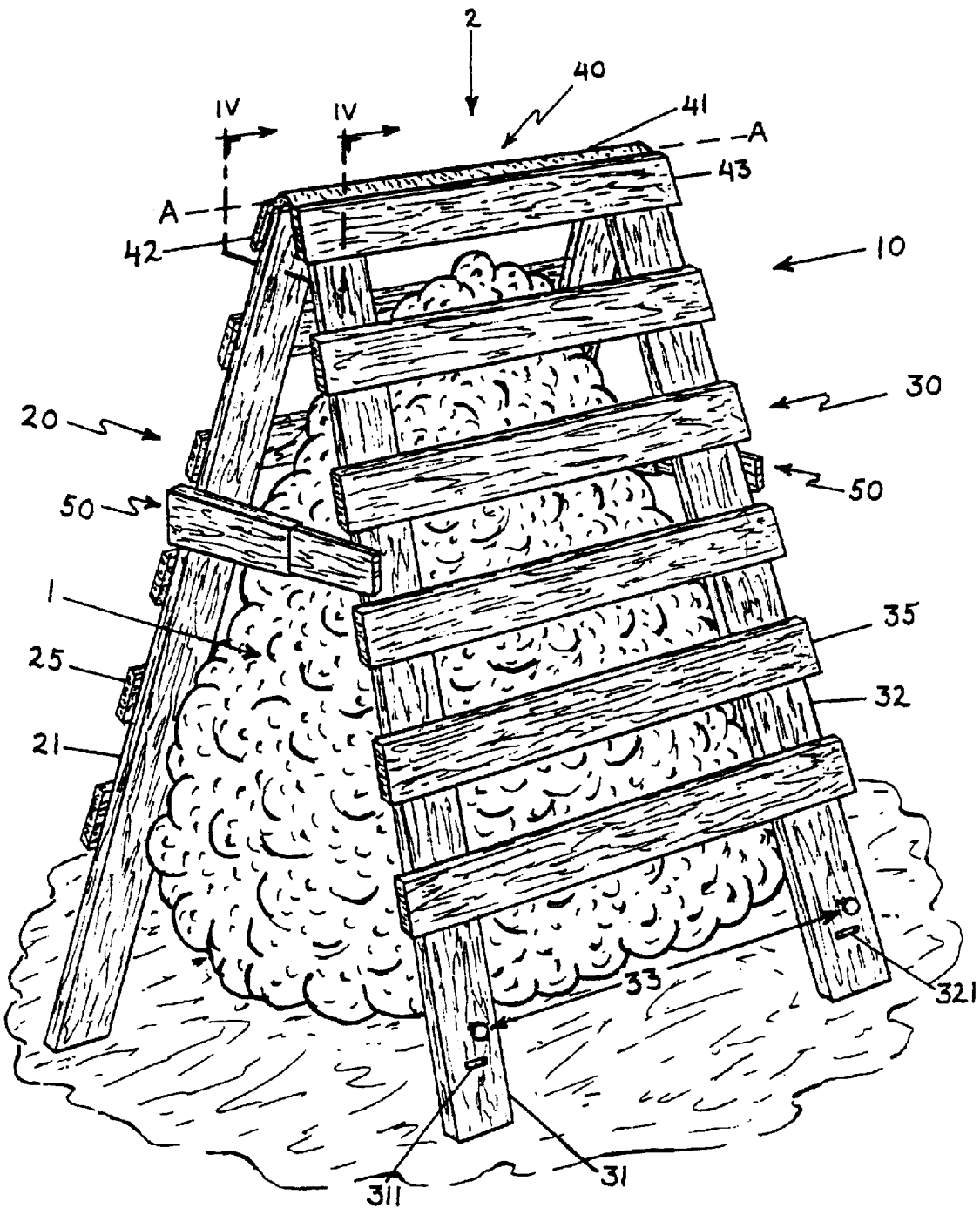
FIG. 1 is a perspective view of a preferred embodiment of the interlocking shrub shelter of the present invention, resting upon the ground above a shrub to be protected, showing two hingedly connected framework panels, configured with horizontal slats connected to vertical leg members, and held in their open position by a pair of adjustable latch arms.

FIG. 1 illustrates a preferred embodiment of the fully assembled interlocking shrub shelter, generally indicated at 10, resting upon the ground on either side and above an ordinary shrub 1 to be protected from falling ice and snow. As shown, shrub shelter 10 comprises two, substantially-identical framework panels 20 (rear) and 30 (front), hinge assembly 40, and a pair of adjustable-length latch arms 50.

Rear and front framework panels 20 and 30 are respectively assembled from a plurality of rectangular, elongated, vertical legs 21,22 and 31,32 which are perpendicularly connected to a plurality of similarly shaped, but shorter, corresponding horizontal slats 25 and 35, to form the protective, rectangular framework panels seen in FIG. 1.

Framework panels 20 and 30 of FIG. 1 are hingedly connected to one another along line A—A, by flexible hinge 41 and its integrally joined slats 42 and 43 of hinge assembly 40, to form the apex 2 of shrub shelter 10. Hinge assembly 40 also stabilizes the upper portion of framework panels 20 and 30 and serves to deflect falling ice and snow.

A pair of adjustable latch arms 50, each one connected to leg members of framework panels 20 and 30 on opposite sides of shrub shelter 10 of FIG. 1, in a middle region of framework panels 20 and 30, hold panels 20 and 30 in an open position during normal use of the shrub shelter and serve to further stabilize framework panels 20 and 30.

All leg, slat and latch arm members of the interlocking shrub shelter 10 of FIG. 1 are of a substantially rigid, durable and lightweight material such as high-impact plastic, extruded polyvinyl, or other similar material. Flexible hinge 41 is of a strong, pliable material such as a polyvinyl. All components are manufactured in a variety of colors and embossed with a woodgrain or similar pattern to simulate real wood construction.

FIGS. 2 and 3 respectively show the rear and front sides of shrub shelter 10 of FIG. 1, with optional framework extender panels 60, to better illustrate their component members and understand how they will be connected to one another during assembly of the shrub shelter.

FIG. 2 shows the rear side of shrub shelter 10 comprising: a rear framework panel 20 with vertical legs 21 and 22 and a plurality of horizontal slats 25; a portion of hinge assembly 40 with flexible hinge 41 integrally joined to a horizontal slat 42; a pair of adjustable latch arms 50 with each receiver arm 51 common to framework panel 20; an optional framework extender panel 60 with two vertical rear leg extenders 61 and a plurality of horizontal extender slats 65; and two ground stakes 11. All rear components are shown in their unassembled positions.

In contrast, FIG. 3 shows the front side of shrub shelter 10, partially assembled, and comprising: a front framework panel 30 with vertical legs 31 and 32 and a plurality of horizontal slats 35; a hinge assembly 40 with a flexible hinge 41 which is commonly and integrally joined to horizontal slat 43 of front panel 30 and to a horizontal slat 42 (FIG. 2) of rear panel 20; a pair of adjustable latch arms 50 with each slidable arm 52 common to framework panel 30; an optional framework extender panel 60 with two vertical front leg extenders 62 and a plurality of horizontal extender slats 65; and two ground stakes 11.

The above comparison clearly illustrates the corresponding relationship of front and rear components of shrub shelter 10 and permits a detailed description of their interlocking mechanisms which will be used to connect component members to one another in assembly of the interlocking shrub shelter 10.

The systematic arrangement of integrally-manufactured keypins, keyholes, bar locks and bar slots, upon their associated component members, provides a unique and functional means of connecting legs, slats and latch arms of shrub shelter 10 to one another without the need or use of any separate parts or fasteners. This feature also permits a convenient and useful means of dismantling a portion of the shrub shelter 10 to remove and replace any component which might be damaged beyond repair.

Referring first to FIG. 2, leg 21 has a plurality of keypins 23 which are strategically spaced and located along its length and at about the midpoint of its width. Substantially-identical keypins 23 are correspondingly located along the length of leg 22. Keypins 63 are similarly located along the length of each rear leg extender 61. One latch arm keypin 26 is located on the outer edge, and above midpoint between the extreme ends, of leg 21. Another latch arm keypin, not shown, is correspondingly located on leg 22. Referring now to FIG. 3, leg 31 has a plurality of keypins 33 located along its length, in the same manner and in corresponding positions as described above for keypins 23 of legs 21 and 22. Substantially-identical keypins 33 are correspondingly located along the length of leg 32. Keypins 63 are similarly located along the length of each front leg extender 62 in corresponding positions to keypins 63 of rear leg extenders 61. One latch arm keypin 36 is located on each leg 31 and 32, in the same corresponding positions described above for latch arm keypins 26 of legs 21 and 22.

Each keypin, as described above, is of the same size, shape and tolerance as to be inserted and interlocked with any keyhole of a corresponding slat or latch arm member described below.

Once again referring to FIG. 2, a plurality of horizontal slats 25 are each seen as having a plurality of keyholes 24, which are strategically spaced and located along the length of each slat 25 and at about the midpoint of its width, with the two outermost to receive and interlock with corresponding keypins 23 of legs 21 and 22. A plurality of keyholes 64, are likewise located along the length of each horizontal extender slat 65, with the two outermost to receive and interlock with corresponding keypins 63 of each rear leg extender 61. A plurality of substantially-identical keyholes 44 are similarly located along the length of slat 42 of hinge assembly 40, with the two outermost to receive and interlock with corresponding keypins 23 of legs 21 and 22.

As depicted by the unconnected slat 35 in FIG.3, a plurality of horizontal slats 35 each have a plurality of keyholes 34 located along their length, in the same manner as described above for keyholes 24 of slats 25, with the two outermost keyholes to receive and interlock with corresponding keypins 33 of legs 31 and 32. Likewise, each extender slat 65 is similarly configured with a plurality of keyholes 64, with the two outermost keyholes to receive and interlock with corresponding keypins 63 of front leg extenders 62. A plurality of keyholes, not shown, are similarly located along slat 43 of hinge assembly 40, with the two outermost keyholes to receive and interlock with corresponding keypins 33 of legs 31 and 32.

Figure 4:
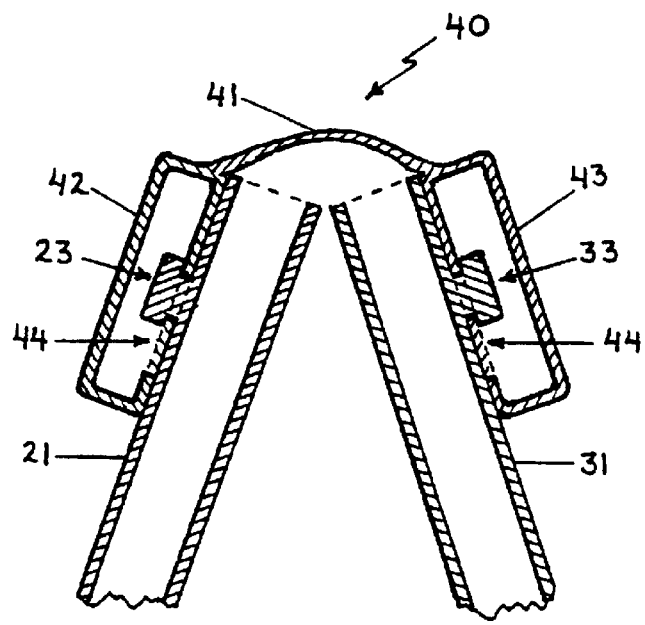
FIG. 4 is an enlarged, fragmentary, cross-sectional view taken along plane IV—IV of FIG. 1 to depict elements of the hinge assembly and connection of its slats, by means of interlocking keyholes-to-keypins, to legs of the front and rear framework panels.

FIG. 4 depicts a portion of the top of framework panels 20 and 30, hingedly connected by hinge assembly 40, with keyholes 44 of slats 42 and 43 respectively interlocked with corresponding keypins 23 and 33 of legs 21 and 31 and with slats 42 and 43 integrally joined by flexible hinge 41.

Figure 5:
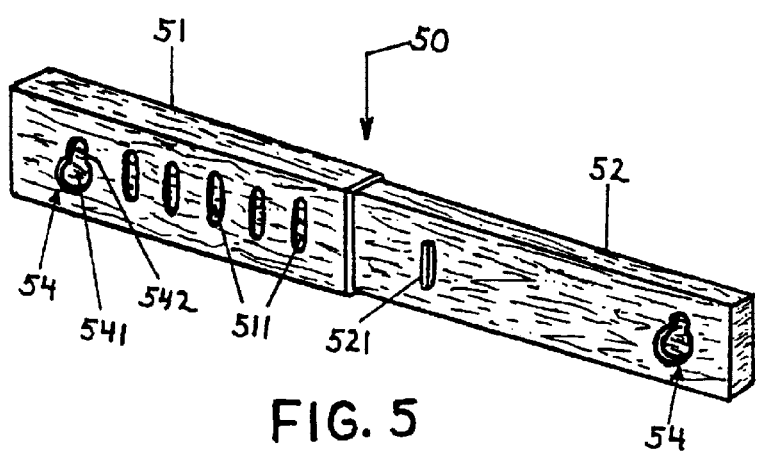
FIG. 5 is an enlarged, perspective view of one adjustable latch arm of FIG. 2 to better illustrate its receiver arm and slidable arm and its integrally manufactured keyholes, bar lock and bar slots.

FIG. 5 shows one of a pair of latch arms 50 (FIGS. 2 and 3) having one keyhole 54, of receiver arm 51, to receive and interlock with a corresponding latch arm keypin 26 of leg 21 (FIG. 2). A corresponding keyhole 54, of a second latch receiver arm 51 (FIG. 2), receives and interlocks with a latch arm keypin, not shown, of leg 22. Another keyhole 54 is located on each slidable arm 52 (FIG. 5) of each latch arm 50 (FIGS. 2 and 3) to respectively interlock with latch arm keypin 36 of leg 31 (FIG. 3) and a corresponding latch arm keypin, not shown, of leg 32.

Each keyhole, described above, is of the same size, shape and tolerance as to receive and interlock with any keypin of a corresponding leg member. The configuration of keypins and keyholes, and the method of interlocking one with the other, will now be described.

As best shown in FIG. 2A, it is evident that keypin 23 of leg 21, is comprised of two parts; a round, elongated pin 232 which is integrally attached to leg 21 at one end and terminated at its opposite end by a round, flat head 231. All keypins 23 and 26, of legs 21 and 22 (FIG. 2), are of the same configuration. Likewise, as seen in FIG. 3, each keypin 33 and each keypin 36, of legs 31 and 32, has a pin 332 and a head 331. Each keypin 63 of rear leg extenders 61 (FIG. 2) and each keypin 63 of front leg extenders 62 (FIG. 3) is similarly configured with a pin 632 and a head 631.

As also seen in FIG. 2A, an integrally-manufactured keyhole 24, of one slat 25, is shown as having two parts; a round, open hole 241 which is of sufficient diameter as to marginally receive the head 231 of a corresponding keypin 23 and being openly joined to an open-end, elongated slot 242, with slot 242 closed at its D opposite end. Each slot 242 is of sufficient width as to marginally receive a pin 232 of a corresponding keypin 23, yet narrow enough to retain a substantial portion of the planar surface of a keypin head 231 behind the adjacent planar surface surrounding keyhole slot 242.

The thickness of the planar surfaces surrounding the hole 241 and the slot 242 of each keyhole 24 is marginally less than the length of the pin 232 of each keypin 23 so as to frictionally and sufficiently engage the planar surface of the keypin head 231 with the adjacent planar surface surrounding the keyhole slot 242 when pin 232 is fully seated in slot 242. The open end of each slot 242, adjoining the open side of hole 241, is slightly constricted so as to positively engage and interlock pin 232 within slot 242 and to prevent accidental dislodging of pin 232.

As generally seen in FIGS. 2, 3, and 5, the shape of all keyholes 34, 44, 54 and 64 are substantially identical to keyholes 24, as described above, each such keyhole respectively configured with holes 341, 441, 541 and 641 and with adjoining slots 342, 442, 542 and 642. Each such keyhole is basically an inverse form of, and marginally larger than, each keypin so as to receive the keypin with the keyhole. Additionally, the above dimensions apply equally to all keyholes and keypins and are of a precise tolerance so that any keypin may be inserted and positively interlocked with any keyhole of shrub shelter 10.

Referring once again to FIG. 5, a protruding bar lock 521 is integrally joined to slidable arm 52. Bar lock 521 is of such size, shape and tolerance as to automatically interlock within any one of a plurality of corresponding, evenly-spaced, open bar slots 511 (complementary bar lock receptacles) of receiver arm 51, as slidable arm 52 is pushed inward or pulled outward within receiver arm 51 of each adjustable latch arm 50. This permits each adjustable latch arm 50 to be shortened or lengthened, as required, to decrease or increase the separation of framework panels 20 and 30 (FIG. 1) to accommodate the varying fullness of most shrubs, plants or trees. It is understood that the shape of the bar lock and bar slots can be not only a "bar", but, e.g., an oval, a circle, a rectangle, or any other suitable shape that permits mating and interlocking suitable to the adjustability function they are designed to serve.

Figure 6:
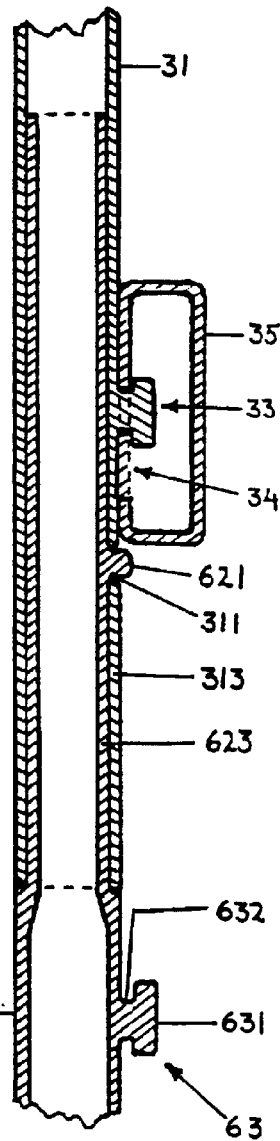
FIG. 6 is an enlarged, fragmentary, cross-sectional view taken along plane VI—VI of FIG. 3 to illustrate a leg extender slidably inserted within the lower portion of an associated leg member and interlocked with one another by means of their respective bar lock and bar slot mechanisms.

Referring now to FIGS. 2, 3 and 6, a somewhat similar bar lock and bar slot feature, as described above, permits optional framework extender panels 60 to be connected to existing framework panels 20 (FIG. 2) and 30 (FIG. 3) to extend the height of shrub shelter 10 of FIG. 1 to accommodate taller shrubs, plants or trees. FIG. 6 depicts such a connection with the upper portion 622, of a front leg extender 62 of framework extender panel 60, fully and slidably inserted within the lower portion 313 of a corresponding front leg 31 of framework panel 30 (FIG. 3). Front leg extender 62 has an integral, protruding bar lock 621 of such size, shape and tolerance as to automatically engage and interlock with a corresponding open-hole bar slot 311 of leg 31 when the upper portion 622 of front leg extender 62 is fully inserted within the lower portion 313 of leg 31. A second front leg extender 62, of this same framework extender panel 60, is similarly configured with a bar lock 621 so that its upper portion 622 may be slidably and fully inserted within the lower portion 323 of leg 32 and interlocked with an open-hole bar slot 321. Each rear leg extender 61 of FIG. 2 is configured with a substantially-identical leg extender bar lock 611 so that the upper portion 612 of a leg extender 61, may be slidably and fully inserted with the lower portion 213 or 223 of a corresponding leg 21 or 22 and respectively interlocked with an open-hole bar slot receptacles 211 or 221. While this is illustrated and referred to as a "bar" lock and slqt, it is understood that other suitable shapes, e.g., rectangles, circles, ovals, etc., are also suitable to achieve the interlocking function.

With regard to the foregoing description of the component members of shrub shelter 10 and their interlocking mechanisms, the complete assembly, operation and use of the interlocking shrub shelter 10 of the present invention may now be explained and understood.

Referring first to FIG. 2, the rear framework panel 20 is assembled as follows: legs 21 and 22 are first placed on a flat horizontal surface with keypins 23 facing up and with bar slots 211 and 221 aligned at the bottom; with keyholes 24 of a slat 25 facing keypins 23 of legs 21 and 22, and with the closed end of its keyhole slots 242 facing the top of legs 21 and 22, the hole 241 of the extreme right-end keyhole 24 of this slat 25 is then placed over the head 231 of the second keypin 23 upward from the bottom of the leg 21; the hole 241 of the extreme left-end keyhole 24 of this same slat 25 is now placed over the head 231 of the second keypin 23 upward from the bottom of leg 22; finally, while holding legs 21 and 22 firmly in place, this same slat 25 is pulled firmly downward to interlock both keyhole slots 242 upon the corresponding pins 232 of both keypins 23, thus engaging and retaining the surface of each head 231 of each keypin 23 behind the adjacent planar surface surrounding the corresponding keyhole slots 242, completing the connection of this slat 25 to legs 21 and 22. Each remaining horizontal slat 25 of rear framework panel 20 is subsequently connected to the next set of corresponding keypins 23 of legs 21 and 22, in the same manner as just described, working in an upward direction from each previously connected slat 25, until all slats 25 have been connected to legs 21 and 22, as seen in FIG. 1.

Now referring to FIG.3, the front framework panel 30 is assembled by connecting all slats 35 to legs 31 and 32, by means of their respective keyholes 34 and keypins 33, in the same general manner as described above for connecting slats 25 to legs 21 and 22 of the rear framework panel 20, as seen in FIG. 1.

As seen in FIGS. 1 and 4, the assembled framework panels 20 and 30 are next hingedly connected to one another by means of hinge assembly 40, as follows: one slat 42 (FIG. 2) is first connected to legs 21 and 22 by interlocking its extreme end keyholes 44 upon the corresponding uppermost keypins 23 of legs 21 and 22, in the same manner as previously described for connecting slats 25 to legs 21 and 22 and slat 43 (FIG. 3) is then connected to legs 31 and 32 by interlocking its two extreme end keyholes 44 to the uppermost set of keypins 33 (FIG. 4), as previously described for connecting slats 35 to legs 31 and 32.

The hingedly connected framework panels 20 and 30, along line A—A at apex 2 of shrub shelter 10, may now be placed at the desired angle to the ground, or either side of shrub 1 to be protected, with the bottom of each leg 21, 22 and 31, 32 resting upon the ground.

Referring to FIGS. 2, 3 and 5 of the drawings, framework panels 20 and 30 are now locked in their open position by means of adjustable latch arms 50. One latch arm 50 (FIG. 5) is first connected to legs 21 and 31 of FIGS. 2 and 3, as follows: with the closed end of its keyhole slots 542 of latch arm 50 facing upward, hole 541 of keyhole 54 of receiver arm 51 (FIG. 5) is placed over the head 261 of latch arm keypin 26 of leg 21 (FIG. 2); hole 541 of keyhole 54 of slidable arm 52, of this same latch arm 50 (FIG. 5), is now placed over the head 361 of latch arm keypin 36 of leg 31 (FIG. 3) and; finally, latch arm 50 is pulled firmly downward to engage each keyhole slot 542 upon corresponding pins 262 and 362 of latch arm keypins 26 and 36, simultaneously interlocking the head 261 and 361 of keypins 26 and 36 behind the surrounding planar surfaces of slots 542 of each keyhole 54 of this latch arm 50.

The second latch arm 50 is then connected to legs 22 and 32, on the opposite side of framework panel 20 and 30, as seen in FIG. 1, by means of interlocking its keyholes 54 (FIGS. 2 and 3) with corresponding latch arm keypins, not shown, of legs 22 and 32 in the same general manner as just described for connecting the first latch arm 50 to legs 21 and 31.

It may be necessary, in making the above connection of latch arms 50, to move one framework panel slightly inward or outward to properly align latch arm keyholes 54 with latch arm keypins 26 and 36 and to engage and interlock each slidable arm bar lock 521 within the closest corresponding receiver arm bar slot 511 of each adjustable latch arm 50.

Framework panels 20 and 30 may be further adjusted inward or outward. The end of each slidable arm 52 is pulled firmly upward to disengage each slidable arm keyhole 54 from corresponding latch arm keypins 36 of each leg 31 and 32. One or both framework panels 20 and 30 may then be repositioned, as desired, and each slidable arm 52 is then reconnected to its corresponding leg 31 and 32, as previously described above for the initial set-up of shrub shelter 10.

If desired, shrub shelter 10 of FIG. 1 may now be staked to the ground to further stabilize the entire structure and to reduce the possibility of its upset from a significant impact of falling ice or snow. To do so, the four ground stakes 11 are driven into the ground and each one is connected to one of the four legs.

Referring to FIG. 2, one ground stake 11 is driven into the ground and connected to leg 21, as follows: this stake 11 is first aligned in front of bar slot 211 of leg 21 with its open keyhole 14 facing the extreme bottom keypin 23 of leg 21 and its stake point 111 touching both the ground and the bottom of leg 21; a downward force is then exerted on the stake head 112, by one's hand or foot or by striking the head 112 with an ordinary hammer, until the hole 141 of keyhole 14 is aligned with the head 231 of the extreme bottom keypin 23 of leg 21; ground stake 11 is then pushed toward leg 21 so as to place hole 141 of keyhole 14 over the head 231 of this same keypin 23 and; finally, a downward force is again applied to stake head 112 to engage and interlock slot 142 of keyhole 14 with pin 232 of keypin 23, to complete connection of the first stake 11 to the ground and to leg 21. A second ground stake 11 is next driven into the ground and connected to the extreme bottom keypin 23 of leg 22, in the same general manner as just described for connecting the first stake 11 to leg 21.

Referring now to FIG. 3, a third ground stake 11 and a fourth ground stake 11 are each driven into the ground, the third stake 11 adjacent to leg 31 and the fourth stake 11 next to leg 32, and respectively connected to legs 31 and 32 in the same general fashion as described above for connecting the first two ground stakes 11 to legs 21 and 22.

As generally seen in FIGS. 2 and 3, one optional framework extender panel 60 may be connected to each framework panel 20 and 30 to extend the height of an existing shrub shelter 10 of FIG. 1. Component leg and slat members of framework extender panels 60 are of the same material and general form of manufacture as leg and slat members of framework panels 20 and 30. Framework extender panels 60 correspond in height, width and color to each available size and color of framework panels 20 and 30. This makes it possible, depending on the length of extender panel 60 selected, for users to extend an existing shrub shelter 10 two-to-three times its initial height to accommodate substantial growth of shrubs, trees and the like. Framework extender panels would most likely be pre-assembled, packaged and sold in pairs, as an optional accessory of the shrub shelter 10 of FIG. 1, but their assembly and connection to framework panels 20 and 30 is fully described below.

Referring first to FIG. 2, one framework extender panel 60, to be connected to rear framework panel 20, is assembled by connecting its plurality of horizontal extender slats 65 to each rear leg extender 61. To do so, the extreme end keyholes 64 of each extender slat 65 are interlocked with the corresponding set of keypins 63 of rear leg extenders 61, in the same general manner as previously described for connecting slats 25 to legs 21 and 22. One additional horizontal slat 25 is included with this optional extender panel 60, to be connected to the bottom set of keypins 23 of legs 21 and 22, of the rear framework panel 20, after this framework extender panel 60 has been connected to legs 21 and 22.

Referring now to FIG. 3, a second framework extender panel 60, to be connected to front framework panel 30, is assembled by connecting its plurality of horizontal extender slats 65 to each of the front leg extenders 62, interlocking the extreme end keyholes of each extender slat 65 with the corresponding set of keypins 63 of front leg extenders 62, in the same manner as earlier described for connecting slats 35 to legs 31 and 32. One additional slat 35 is included with this optional extender panel 60, to be connected to the bottom set of keypins 33 of legs 31 and 32, of front framework panel 30, after this framework extender panel 60 has been connected to legs 31 and 32.

One of the fully assembled framework extender panels 60, as described above, is now connected to each framework panel 20 and 30. As depicted in FIG. 6, the upper portion 623 of a front leg extender 62 is of the size, shape and tolerance as to be snugly and slidably inserted within the lower portion 313 of leg 31. The bar lock 621, of this front leg extender 62, automatically engages and interlocks with bar slot 311 of leg 31 when the upper portion 623 of the front leg extender 62 is fully inserted within the lower portion 313 of leg 31. A second front leg extender 62 is similarly connected to leg 32 with bar lock 621 interlocking with bar slot 321, as seen in FIG. 3. FIG. 6 also shows a slat 35 with its keyhole 34 connected to keypin 33 of leg 31. Leg extender 62 also is seen as having a keypin 63 with a head 631 and a pin 632 to be interlocked with a keyhole 64 of a horizontal extender slat 65 (FIG. 3).

FIG. 3 shows the connection of a framework extender panel 60 to legs 31 and 32 of front framework panel 30. FIG. 2 shows another framework extender panel 60 in position to be connected to legs 21 and 22 of rear framework panel 20, where the upper portion 613 of each rear leg extender 61 is to be inserted within the lower portion 213 or 223 of corresponding legs 21 and 22. When fully inserted, the bar lock 611 of each rear leg extender 61 will automatically engage and interlock, respectively, with a corresponding bar slot 211 or 221 of legs 21 and 22.

After each extender panel 60 has been connected to its corresponding framework panel 20 or 30, each additional horizontal slat 25 and 35, included with each framework extender panel 60, is respectively connected to legs 21, 22 and 31, 32 of the corresponding framework panels 20 and 30, as described earlier for connecting all other slats 25 and 35 to legs 21, 22 and 31, 32. If desired, each framework extender panel 60 may be easily disconnected from its corresponding framework panel 20 or 30. To do so, pressure is applied to the face of each bar lock 611 or 621 to disengage it from its corresponding bar slot 211, 221 or 311, 321 while pulling downward on its associated leg extender 61 or 62.

An additional framework extender panel 60 may also be connected to any existing framework extender panel 60, in the same general manner as described above, with its bar locks 611 or 621 respectively engaging bar slots 612 (FIG. 2) or 622 (FIG. 3) of the previously connected extender panel. This feature allows for even greater height extension of the interlocking shrub shelter, if desired. Each additional framework extender panel 60 is easily disconnected from another extender panel 60 in the same general manner as just described for disconnecting extender panel 60 from primary framework panels 20 and 30.

Shrub shelter 10, extended in height by framework extender panels 60, may also be staked to the ground by means of the four ground stakes 11. The four ground stakes 11 are driven into the ground, one in front of each leg extender 61 and 62, and each stake 11 is then connected to the extreme bottom keypin 63 of its corresponding leg extender 61 and 62, as previously described for connected each stake 11 to keypins 23 and 33 of legs 21, 22 and 31, 32.

Following its seasonal fall and winter use the shrub shelter of FIG. 1, with or without framework extender panels 60, may be conveniently stored in its entirety. Each slidable arm 52 of each adjustable latch arm 50 (FIGS. 1, 2 and 3) is simply disconnected from its corresponding latch pin 26 or 36 (FIGS. 2 and 3), allowing framework panels 20 and 30 to be folded flat, one against the other, by means of hinge assembly 40. This feature permits a number of shrub shelters 10 of FIG. 1 to be neatly and stackably stored in relatively little space.

FIG. 7 illustrates a partially assembled alternate embodiment 100 of the interlocking shrub shelter of the present invention comprising; two substantially-identical, opposing framework panels 80 (rear) and 90 (front), a hinge assembly 40 (the same as shown for shrub shelter 10 of FIG. 1), a pair of adjustable latch arms 50 (the same as shown for shrub shelter 10 of FIG. 1), four ground stakes 11 (the same as shown for shrub shelter 10 of FIG. 1) and two optional framework extender panels 70, shown by broken lines, as they would appear if connected to front and rear framework panels 90 and 80.

Shrub shelter 100 and its optional framework extender panels 70 would be manufactured and available to consumers in several sizes and a variety of colors, in a ready-to-use form, as similarly described earlier for shrub shelter 10 of FIG. 1. Its component members, of the same material and general form of manufacture as those of shrub shelter 10 of FIG. 1, will now be described.

Rear framework panel 80 of shrub shelter 100 of FIG. 7 comprises vertical legs 81 and 82, at least one vertical slat 87, and a plurality of horizontal slats 85. Each leg 81 and 82 has a plurality of keypins 83 located along its length and one latch arm keypin 86, each such keypin respectively configured with heads 831, 861 and pins 832, 862. The location and configuration of keypins 83 and 86 are substantially identical to keypins 23 of legs 21 and 22 of shrub shelter 10 of FIG. 1, as described earlier. Each vertical slat 87 of FIG. 7 is substantially identical to legs 81 and 82, having a plurality of corresponding keypins 83 along its length, but is slightly shorter than legs 81 and 82 and does not have a latch arm keypin. Horizontal slats 85 are substantially identical to slats 25 of shrub shelter 10 of FIG. 1, each having a plurality of keyholes 84 along its length which correspond in location, number and configuration to keyholes 24 of slats 25, each keyhole 84 having a hole 841 and a slot 842.

Front framework panel 90 of shrub shelter 100 of FIG. 7 is essentially a mirror image of rear framework panel 80, as just described above. It comprises: legs 91 and 92, each having a plurality of keypins, not shown, and one latch arm keypin 96 which correspond to keypins 83 and latch arm keypin 86 of legs 81 and 82; a plurality of vertical slats 97, each having a plurality of keypins, not shown, which correspond to keypins 83 of vertical slats 87 and; a plurality of horizontal slats 95, each having a plurality of keyholes, not shown, which correspond to keyholes 84 of horizontal slats 85.

Framework panels 80 and 90 of FIG. 7 are hingedly connected along line B—B, by hinge assembly 40, to form apex 3 of shrub shelter 100. Hinge assembly 40 of shrub shelter 100 is of the same form and manufacture as described earlier for hinge assembly 40 of shrub shelter 10 of FIG. 1.

A pair of adjustable latch arms 50, each one to be connected to leg members of framework panels 80 and 90 on opposite sides of shrub shelter 100 of FIG. 7, hold framework panels 80 and 90 in their open position. Latch arms 50 of shrub shelter 100 are of the same form and manufacture as described earlier for latch arms 50 of shrub shelter 10 of FIG. 1.

The four ground stakes 11 seen in FIG. 7 are used, if desired, to stake shrub shelter 100 to the ground, with or without attached framework extender panels 70, in the same general manner as described for staking shrub shelter 10 of FIG. 1 to the ground.

The method of connecting leg, slat and latch arm members of shrub shelter 100 to one another, by means of their interlocking two-part keypins and two-part corresponding keyholes, is essentially the same as described earlier for connecting similar component members of shrub shelter 10 of FIG. 1 to one another.

With regard to the foregoing account and description of shrub shelter 100 and its component members and interlocking mechanisms, the assembly, operation and use of this alternate embodiment 100 of the interlocking shrub shelter may now be explained and understood.

The assembly of shrub shelter 100 of FIG. 7 begins with a partial assembly of rear framework panel 80, using vertical legs 81 and 82 and a plurality of horizontal slats 85. Legs 81 and 82 are first placed on a flat horizontal surface with their keypins 83 facing up and with their bar slots 811 and 821 aligned at the bottom; with keyholes 84 of one horizontal slat 85 facing keypins 83 of legs 81 and 82, and with the closed end of its keyhole slots 842 facing the bottom of legs 81 and 82, the hole 841 of the extreme left-end keyhole 84 of this slat 85 is placed over the head 831 of the second keypin 83 upward from the bottom of leg 81; the hole 841 of the extreme right-end keyhole 84 of this same slat 85 is now placed over the head 831 of the second keypin 83 upward from the bottom of leg 82 and; finally, while holding legs 81 and 82 firmly in place, this slat 85 is pulled upward to interlock the slots 842 of each extreme end keyhole 84 upon the corresponding pins 832 of keypins 83, simultaneously engaging the surface of each head 831 of keypins 83 snugly behind the adjacent planar surface surrounding corresponding slots 842 of each keyhole 84, to complete the connection of this horizontal slat 85 to vertical legs 81 and 82.

A second horizontal slat 85 is now connected to legs 81 and 82 by engaging and interlocking its extreme end keyholes 84 with the second set of keypins 83 upward from the first-connected slat 85, in the same manner as just described for connecting the first slat 85 to legs 81 and 82. A third slat 85 is likewise connected to the second set of keypins 83 upward from the second-connected slat 85. All remaining horizontal slats 85 are subsequently connected to legs 81 and 82 in the manner just described, skipping one set of keypins 83 between each previously connected slat 85, to complete the partial assembly of rear framework panel 80.

Final assembly of rear framework panel 80 of FIG. 7 is accomplished by perpendicularly connecting each vertical slat 87 to each of the previously-connected horizontal slats 85. With its keypins 83 facing keyholes 84 of horizontal slats 85, the head 831 of the extreme bottom keypin 83 of one vertical slat 87 is inserted into hole 841 of the keyhole 84, of bottom slat 85, which is located nearest to leg 81; the head 831 of each keypin 83 of this same slat 87 is then aligned and inserted into the hole 841 of each corresponding keyhole 84, of the remaining horizontal slats 85, which are located nearest to leg 81 and; finally, this slat 87 is pulled firmly downward to interlock its pins 832 within slots 842 of each corresponding keyhole 84 of each slat 85, simultaneously engaging the surface of each keypin head 831 behind the adjacent planar surface surrounding each corresponding keyhole slot 842.

Each remaining vertical slat 87 is then connected to each of the previously connected horizontal slats 85, in the manner just described, beginning with the open keyhole 84 of each slat 85 nearest to the vertical slat 87 so previously connected. This completes full assembly of rear framework panel 80 of shrub shelter 100.

Once again referring to FIG. 7, front framework panel 90 of shrub shelter 100 is next assembled, following the same general procedure as described above for assembly of rear framework panel 80, by first connecting its plurality of horizontal slats 95 to legs 91 and 92 and then connecting its plurality of vertical slats 97 to each horizontal slat 95.

As generally seen in FIG. 7, the fully assembled framework panels 80 and 90 of shrub shelter 100 are now connected to one another by means of hinge assembly 40. Slat 42 is first connected to legs 81, 82 and vertical slats 87, as follows: with slat 42 keyholes 44 (FIG. 2) facing the keypins 83 of legs 81, 82 and keypins 83 of vertical slats 87, and with the closed end of its keyhole slots 442 (FIG. 2) facing upward, the hole 441 of each keyhole 44 of slat 42 (FIG. 2) is first placed over the head 831 of each corresponding leg and vertical slat keypin 83 and; slat 42 is then pulled firmly downward to interlock its keyhole slots 442 upon the pins 832 of corresponding keypins 83, simultaneously engaging each head 831 of each keypin 83 behind the adjacent planar surface surrounding each corresponding slot 442 of each keyhole 44 of slat 42.

Slat 43 of hinge assembly 40 is then connected to legs 91, 92 and to vertical slats 97 of the front framework panel 90, in the same general manner as just described for connecting slat 42 to legs 81, 82 and to vertical slats 87 of rear framework panel 80.

The hingedly connected framework panels 80 and 90 of shrub shelter 100 may now be placed on either side and above a shrub, plant or tree to be protected. Full assembly of the shelter is completed by positioning panels 80 and 90 at the desired angle to the ground and securing their open position by connecting the pair of adjustable latch arms 50 to the legs of each framework panel 80 and 90.

One latch arm 50 is first connected, by means of its keyholes 54 (FIG. 5), to latch arm keypins 86 and 96 of legs 81 an 91 in the same general manner as previously described for connecting a latch arm 50 to legs 21 and 31 of shrub shelter 10 of FIG. 1. The second adjustable latch arm 50 is then connected, in this same manner, to legs 82 and 92 on the opposite side of framework panels 80 and 90. The framework panels may be adjusted inward or outward, by means of the adjustable latch arms 50, as earlier described for adjusting framework panels 20 and 30 of shrub shelter 10.

Referring again to FIG. 7, optional framework extender panels 70, indicated by broken lines, may be connected to framework panels 80 and 90 to extend the height of shrub shelter 100 to accommodate taller shrubs or trees. One framework extender panel 70, to be connected to rear framework panel 80, is first assembled by connecting each horizontal slat 75 to each rear leg extender 71 and then connecting a plurality of substantially-identical, but shorter vertical slat extenders 77 to each horizontal slat 75. This is done following the same general procedure as earlier described for full and partial assembly of rear framework panel 80.

A second framework extender panel 70, to be connected to front framework panel 90, is then assembled with each front leg extender 72 first being connected with each horizontal slat 75 and then connecting a plurality of vertical slat extenders 77 to each horizontal slat 75, in the same way as just described for assembly of the first framework extender panel 70.

Each rear leg extender 71 is configured with an integral bar lock 711 to engage and interlock with a corresponding integral bar slot 811 and 821 of legs 81 and 82. Each rear panel vertical slat extender 77 is likewise configured with a bar lock 771 to engage and interlock with a corresponding bar slot 871 of each vertical slat 87.

Each front leg extender 72 and each vertical slat extender 77 of the front framework extender panel 70 is likewise configured with a bar lock, not shown, to engage and interlock with a corresponding bar slot, not shown, of each vertical leg 91, 92 and each vertical slat 97 of front framework panel 90.

The bar lock and bar slot feature, as described above, permits framework extender panels 70 to be easily connected and interlocked with members of the front and rear framework panels 90 and 80, in the same general manner as previously described for connecting framework extender panels 60 to the front and rear framework panels 30 and 20 of shrub shelter 10.

Depending on the length of framework panels 80 and 90 and the length of extender panels 70 selected, an existing shrub shelter 100 may be extended two-to-three times its initial height. If desired, framework extender panels 70 may be disconnected from framework panels 80 and 90, in the same general manner as described earlier for disconnecting framework extender panels 60 from framework panels 20 and 30 of shrub shelter 10 of FIG. 1, by depressing each bar lock 711 and 771 while pulling downward on its associated leg extender 71, 72 or vertical slat extender 77.

Additional framework extender panels 70 may be added, if desired, to further extend the height of the interlocking shrub shelter 100. This is done in the same manner as described above for connecting primary panels 80 and 90, but with its bar locks 711 and 771 respectively engaging bar slots 712 and 772 of the previously connected extender panel. Each additional panel 70 is easily disconnected from another extender panel 70 in the same general manner as just described for disconnecting extender panels 70 from primary framework panels 80 and 90.

As with shrub shelter 10, the alternate embodiment shrub shelter 100 my be conveniently and stackably stored in its entirety, following its seasonal use, by disconnecting each slidable arm 52 of each latch arm 50 and folding panels 80 and 90 against one another, by means of hinge assembly 40.

It should be observed in comparing FIG. 1 with FIG. 7, that certain other variations combining features from each of these embodiments may also be configured, fully within the scope of this disclosure and its associated claims. For example, in FIG. 1, the horizontal slats reside outside and the vertical legs reside inside the inverted-V structure of the shrub shelter, and there are no vertical slats other than the vertical left and right legs. By contrast, in FIG. 7, the horizontal slats reside inside and the vertical legs and slats reside outside the inverted-V structure. It would be obvious within the scope of this disclosure and its associated claims, to invert the configuration of FIG. 1 so that the horizontal slats reside inside and the vertical legs reside outside the inverted-V structure, thereby achieving the configuration of FIG. 7 but without any vertical slats. Similarly, one could readily invert the configuration of FIG. 7 so that the horizontal slats reside outside and the vertical legs and slats reside inside the inverted-V, thereby achieving the configuration of FIG. 1, but with the addition of vertical slats. Similarly, variations in the number of slats (vertical and horizontal) used in any given configuration is readily varied, and the illustration of a particular number of slats herein is exemplary only, and in no way limits other configurations involving different numbers of slats. Finally, while the vertical leg (21, 22, 31, 32, 81, 82, 91, 92) is presented as a "different" component from the vertical slat (87, 97), it would be obvious to use the same module for each, and to optionally add to the bottom of the vertical legs an extender panel (60, 70) similar to that introduced in FIG. 2, thereby enabling the vertical legs and the vertical slats to be substantially the same module.

It is also an obvious substitution providing a fully equivalent outcome, to reverse male and female configurations as between various selected keypins and keyholes illustrated herein, in varying combination, to assemble the various modular components illustrated herein. Similarly, other connection means known in the art can be equivalently substituted for the keyhole/keypin connectors used to illustrate this disclosure.

It should be understood that the use of terms such as "upward", "downward", "inward", "outward", "midway", "midpoint", "front", "rear", "top", "bottom", "upper", "lower", "uppermost", "increase", "decrease", "nearest", "marginally", "similarly", "correspondingly", "respectively", "strategically", "likewise", "associated", "substantially-identical", "perpendicularly", "horizontal", "vertical", "integral", "interlocked", "optional", and "additional" are used simply for explanatory reasons and are not intended to limit the scope of the present invention herein described.

While the present invention has been fully described through specific terms and examples, relative to the preferred and alternate embodiments of the interlocking shrub shelter, other forms will now be obvious to those skilled in the art. For example: the basic modular components might be significantly reduced in number to further reduce production costs by manufacturing the framework panels and extender panels in either a one-piece or two-piece configuration while still maintaining protective framework panels with the same leg and slat appearance. In any event, all components would continue to be connected to one another by means of integrally manufactured interlocking mechanisms. Therefore, it is not intended that the invention be limited to the precise form described and shown herein, for modifications and changes may be made in the size, shape, form and function of materials, as well as manufacture technique, without departing from the scope and spirit of the invention defined by the following claims.

Thus, while only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A modular, interlocking shrub shelter comprising:
   a rear framework panel;
   a front framework panel;
   modular hinge assembly means connecting together a top of said rear framework panel comprising rear framework panel top interlocking means and a top of said front framework panel comprising front framework panel top interlocking means, in an inverted-V configuration to form an apex of said shrub shelter; and
   at least one pair of modular latch arm means with a plurality of latch arm interlocking means connecting together rear middle interlocking means of a middle region of said rear framework panel with front middle region interlocking means of a middle region of said front framework panel, thereby maintaining and stabilizing said inverted-V configuration;
   said front framework panel and said rear framework panel each further comprising:
   an elongated modular left leg with a plurality of left leg interlocking means;
   an elongated modular right leg substantially identical to, and oriented substantially parallel to, said modular left leg, with a plurality of right leg interlocking means substantially identical to said left leg interlocking means; and
   a plurality of substantially-identical elongated modular horizontal slats horizontally oriented substantially parallel to one another, with a plurality of horizontal slat interlocking means, connecting said modular left leg to said modular right leg; wherein
   said rear framework panel top interlocking means and said front framework panel top interlocking means each comprise a top one of said plurality of left leg interlocking means of said left leg and a top one of said plurality of right leg interlocking means of said right leg; wherein said rear hinge slat interlocking means are so-mated with said rear framework panel top interlocking means by mating one of said plurality of rear hinge slat interlocking means with said top one of said plurality of left leg interlocking means and another one of said plurality of rear hinge slat interlocking means with said top one of said plurality of right leg interlocking means of said left and right legs used for said rear framework panel; wherein said front hinge slat interlocking means are so-mated with said front framework panel top interlocking means by mating one of said plurality of front hinge slat interlocking means with said top one of said plurality of left leg interlocking means and another one of said plurality of front hinge slat interlocking means with said top one of said plurality of right leg interlocking means of said left and right legs used for said front framework panel; and wherein for each one of said plurality of horizontal slats, one of said plurality of horizontal slat interlocking means is mated with one of said plurality of left leg interlocking means, and another one of said plurality of horizontal slat interlocking means is mated with one of said plurality of right leg interlocking means, thereby so-connecting said modular left leg to said modular right leg and forming said rear framework panel and said front framework panel.

2. The shrub shelter of claim 1, said modular hinge assembly means further comprising:

at least one elongated modular rear hinge slat with a plurality of rear hinge slat interlocking means;

at least one elongated modular front hinge slat with a plurality of front hinge slat interlocking means; and flexible hinge means fabricated from a strong, pliable material integrally joining together said at least one rear hinge slat and said front hinge slat; wherein said rear hinge slat interlocking means are mated with said rear framework panel top interlocking means and said front hinge slat interlocking means are mated with said front framework panel top interlocking means; thereby connecting together said top of said rear framework panel and said top of said front framework panel in said inverted-V configuration.

3. The shrub shelter of claim 1, said front framework panel and said rear framework panel each further comprising:

at least one elongated modular vertical slat oriented substantially parallel to said left leg and said right leg, with a plurality of vertical slat interlocking means, each of said modular vertical slats substantially identical to one another;

said horizontal slats with said plurality of horizontal slat interlocking means connecting said modular left leg to said modular right leg, and further to said at least one vertical slat; wherein for each one of said plurality of horizontal slats, in addition to one of said plurality of horizontal slat interlocking means being mated with one of said plurality of left leg interlocking means, and another one of said plurality of horizontal slat interlocking means being mated with one of said plurality of right leg interlocking means, at least one more of said plurality of horizontal slat interlocking means is mated with one of said plurality of vertical slat interlocking means, thereby so-connecting together said modular left leg, said modular right leg, and said at least one vertical slat, and thereby forming said rear framework panel and said front framework panel.

4. The shrub shelter of claim 3, said modular hinge assembly means further comprising:

at least one elongated modular rear hinge slat with a plurality of rear hinge slat interlocking means;

at least one elongated modular front hinge slat with a plurality of front hinge slat interlocking means; and flexible hinge means fabricated from a strong, pliable material integrally joining together said at least one rear hinge slat and said front hinge slat; wherein said rear hinge slat interlocking means are mated with said rear framework panel top interlocking means and said front hinge slat interlocking means are mated with said front framework panel top interlocking means; thereby connecting together said top of said rear framework panel and said top of said front framework panel in said inverted-V configuration.

5. The shrub shelter of claim 1, wherein a substantially identical configuration of interlocking components is used as said interlocking means to mate:

said one of said plurality of rear hinge slat interlocking means with said top one of said plurality of left leg interlocking means of said left leg of said rear framework panel;

said another one of said plurality of rear hinge slat interlocking means with said top one of said plurality of right leg interlocking means of said right leg of said rear framework panel;

said one of said plurality of front hinge slat interlocking means with said top one of said plurality of left leg interlocking means of said left leg of said front framework panel;

said another one of said plurality of front hinge slat interlocking means with said top one of said plurality of right leg interlocking means of said right leg of said front framework panel;

for said each one of said plurality of horizontal slats means, said one of said plurality of horizontal slat interlocking means with said one of said plurality of left leg interlocking means, and said another one of said plurality of horizontal slat interlocking means with said one of said plurality of right leg interlocking means; and said at least one pair of modular latch arm means to said middle region of said rear framework panel and to said middle region of said front framework panel.

6. The shrub shelter of claim 4, wherein a substantially identical configuration of interlocking components is used as said interlocking means to mate:

said one of said plurality of rear hinge slat interlocking means with said top one of said plurality of left leg interlocking means of said left leg of said rear framework panel;

said another one of said plurality of rear hinge slat interlocking means with said top one of said plurality of right leg interlocking means of said right leg of said rear framework panel;

said one of said plurality of front hinge slat interlocking means with said top one of said plurality of left leg interlocking means of said left legs of said front framework panel;

said another one of said plurality of front hinge slat interlocking means with said top one of said plurality of right leg interlocking means of said right leg of said front framework panel;

for said each one of said plurality of horizontal slats means, said one of said plurality of horizontal slat interlocking means with said one of said plurality of left leg interlocking means, said another one of said plurality of horizontal slat interlocking means with said one of said plurality of right leg interlocking means, and said at least one more of said plurality of horizontal slat interlocking means said one of said plurality of vertical slat interlocking means; and said at least one pair of modular latch arm means to said middle region of said rear framework panel and to said middle region of said front framework panel.

7. The shrub shelter of claim 1, further comprising:

at least four framework panel extender means respectively mating with bottoms of said left and right legs of said rear framework panel and bottoms of said left and right legs of said front framework panel, thereby extending and adjusting heights of said respective legs and of said shrub shelter.

8. The shrub shelter of claim 4, further comprising:

at least four framework panel extender means respectively mating with bottoms of said left and right legs of said rear framework panel and bottoms of said left and right legs of said front framework panel, thereby extending and adjusting heights of said respective legs and of said shrub shelter.

9. The shrub shelter of claim 1, further comprising:

at least four ground stakes respectively mating with bottoms of said left and right legs of said rear framework panel and of said left and right legs of said front framework panel, thereby firmly anchoring said shrub shelter into a ground supporting said shrub shelter.

10. The shrub shelter of claim 4, further comprising:

at least four ground stakes respectively mating with bottoms of said left and right legs of said rear framework panel and of said left and right legs of said front framework panel, thereby firmly anchoring said shrub shelter into a ground supporting said shrub shelter.

11. The shrub shelter of claim 1, said latch arm means further comprising at least one bar lock and at least one complementary bar lock receptacle means mating and interlocking with said at least one bar lock means, wherein the length of said latch arm means is adjusted by slidably moving said at least one bar lock means and said at least one complementary bar lock receptacle means relative to one another until a desired length is achieved, and then mating together said at least one bar lock means and said at least one complementary bar lock receptacle means.

12. The shrub shelter of claim 7, said left legs and said right legs each further comprising at least one open-hole bar slot, and said framework panel extender means further comprising at least one leg extender bar lock receptacle means, wherein said legs and said framework panel extender means are so-mated by mating and interlocking said at least one open-hole bar slot with said at least one leg extender bar lock receptacle means.

13. The shrub shelter of claim 8, said left legs and said right legs each further comprising at least one open-hole bar slot means, and said framework panel extender means further comprising at least one leg extender bar lock receptacle means, wherein said legs and said framework panel extender means are mated by mating and interlocking said at least one open-hole bar slot means with said at least one leg extender bar lock receptacle means.

14. A shrub shelter assembled solely from modular, interlocking components, without the use of hand tools, said modular, interlocking components comprising:

modular hinge assembly means further comprising:

at least one elongated modular rear hinge slat with a plurality of rear hinge slat interlocking means;

at least one elongated modular front hinge slat with a plurality of front hinge slat interlocking means; and flexible hinge means fabricated from a strong, pliable material integrally joining together said at least one rear hinge slat and said at least one front hinge slat;

at least four substantially-identical elongated modular legs with a plurality of leg interlocking means and at least one middle region interlocking means;

at least one pair of substantially-identical modular, latch arm means with a plurality of latch arm interlocking means; and a plurality of substantially-identical elongated modular horizontal slats with a plurality of horizontal slat interlocking means; wherein:

in an assembled configuration of said shrub shelter:

one of said plurality of rear hinge slat interlocking means is mated with a top one of said plurality of leg interlocking means on a left rear one of said at least four elongated modular legs;

another one of said plurality of rear hinge slat interlocking means is mated with a top one of said plurality of leg interlocking means on a right rear one of said at least four elongated modular legs;

one of said plurality of front hinge slat interlocking means is mated with a top one of said plurality of leg interlocking means on a left front one of said at least four elongated modular legs;

another one of said plurality of front hinge slat interlocking means is mated with a top one of said plurality of leg interlocking means on a right front one of said at least four elongated modular legs;

one of said plurality of latch arm interlocking means of a first one of said at least one pair of modular, latch arm means is mated with rear middle interlocking means of a middle region of said left rear leg;

another one of said plurality of latch arm interlocking means of said first one of said at least one pair of modular, latch arm means is mated with rear middle interlocking means of a middle region of said right front leg;

one of said plurality of latch arm interlocking means of a second one of said at least one pair of modular, latch arm means is mated with rear middle interlocking means of a middle region of said right rear leg;

another one of said plurality of latch arm interlocking means of said second one of said at least one pair of modular, latch arm means is mated with rear middle interlocking means of a middle region of said left front leg;

for each one of a rear group of said plurality of horizontal slats, one of said plurality of horizontal slat interlocking means is mated with one of said leg interlocking means of said left rear leg, and another one of said plurality of horizontal slat interlocking means is mated with one of said plurality of said leg interlocking means of said right rear legs, thereby forming a rear framework panel of said shrub shelter; and for each one of a front group of a remainder of said plurality of horizontal slats, one of said plurality of horizontal slat interlocking means is mated with one of said leg interlocking means of said left front leg, and another one of said plurality of horizontal slat interlocking means is mated with one of said plurality of said leg interlocking means of said right front leg, thereby forming a front framework panel of said shrub shelter.

15. The shrub shelter of claim 14, said modular, interlocking components comprising at least one substantially-identical elongated modular vertical slat with a plurality of vertical slat interlocking means; wherein, in said assembled configuration of said shrub shelter:

for any one of said vertical slats included in said rear framework panel, for each one of said rear group of said plurality of horizontal slats, one said plurality of horizontal slat interlocking means is mated with one of said plurality of vertical slat interlocking means; and for any one of said vertical slats included in said front framework panel, for each one of said front group of said plurality of horizontal slats, one said plurality of horizontal slat interlocking means is mated with one of said plurality of vertical slat interlocking means.

16. A method for assembling a modular, interlocking shrub shelter comprising the steps of:

connecting together a top of a rear framework panel comprising rear framework panel top interlocking means and a top of a front framework panel comprising rear framework panel top interlocking means in an inverted-V configuration to form an apex of said shrub shelter, using modular hinge assembly means;

maintaining and stabilizing said inverted-V configuration by connecting together rear middle interlocking means of a middle region of said rear framework panel with front middle region interlocking means of a middle region of said front framework panel, using at least one pair of modular, latch arm means with a plurality of latch arm interlocking means; wherein the step of so-connecting together said top of said rear framework panel and said top of said front framework panel comprises the further steps of:

mating said rear and front hinge slat interlocking means with said respective rear and front framework panel top interlocking means by mating one of said plurality of respective rear and front hinge slat interlocking means with a too one of a plurality of respective left rear and left front leg interlocking means and another one of said plurality of respective rear and front hinge slat interlocking means with a top one of a plurality of respective right rear and right front leg interlocking means, of respective elongated modular left and right rear, and left and right front legs used for said respective rear and front framework panels; said rear and front right legs oriented substantially parallel to said respective rear and front left legs; said elongated modular left rear, right rear, left front, and right front legs substantially identical to one another; and said pluralities of leg interlocking means substantially identical to one another; and wherein a method of assembling said front framework panel and said rear framework panel comprises the steps of:

for each one of a plurality of substantially-identical elongated modular horizontal slats horizontally oriented substantially parallel to one another, each with a plurality of horizontal slat interlocking means, connecting said modular left legs to said modular right legs, for both said rear and said front legs by:

mating one of said plurality of horizontal slat interlocking means with one of said plurality of left rear and front leg interlocking means, and mating another one of said plurality of horizontal slat interlocking means with one of said plurality of respective right rear and front leg interlocking means.

17. The method of claim 16, wherein the step of so-connecting together said top of said rear framework panel and said top of said front framework panel in said inverted-V configuration by so-connecting together a top of a rear framework panel and a top of a front framework panel, comprises the further steps of:

providing as said modular hinge assembly, at least one elongated modular rear hinge slat and at least one elongated modular front hinge slat, integrally joined together with flexible hinge means fabricated from a strong, pliable material;

mating rear hinge slat interlocking means of said at least one elongated modular rear hinge slat, with said rear framework panel top interlocking means; and mating front hinge slat interlocking means of said at least one elongated modular front hinge slat, with said front framework panel top interlocking means.

18. The method of claim 16, wherein a method of assembling said front framework panel and said rear framework panel comprises the steps of:

for each one of said plurality of substantially-identical elongated modular horizontal slats horizontally oriented substantially parallel to one another, each with said plurality of horizontal slat interlocking means, in addition to connecting together said modular left legs to said modular right legs, for both said rear and said front legs, also connecting said left legs and said right legs together with at least one elongated modular vertical slat with a plurality of vertical slat interlocking means; said vertical slats oriented substantially parallel to said left legs and said right legs, and each of said modular vertical slats substantially identical to one another, by:

mating at least one more of said plurality of horizontal slat interlocking means with one of said plurality of vertical slat interlocking means.

19. The method of claim 18, wherein the step of so-connecting together said top of said rear framework panel and said top of said front framework panel in said inverted-V configuration by so-connecting together a top of a rear framework panel and a top of a front framework panel, comprises the further steps of:

providing as said modular hinge assembly, at least one elongated modular rear hinge slat and at least one elongated modular front hinge slat, integrally joined together with flexible hinge means fabricated from a strong, pliable material;

mating rear hinge slat interlocking means of said at least one elongated modular rear hinge slat, with said rear framework panel top interlocking means; and mating front hinge slat interlocking means of said at least one elongated modular front hinge slat, with said front framework panel top interlocking means.

20. The method of claim 16, comprising the further steps of using a substantially identical configuration of interlocking components as said interlocking means for mating:

said one of said plurality of rear hinge slat interlocking means with said top one of said plurality of left leg interlocking means of said left leg of said rear framework panel;

said another one of said plurality of rear hinge slat interlocking means with said top one of said plurality of right leg interlocking means of said right leg of said rear framework panel;

said one of said plurality of front hinge slat interlocking means with said top one of said plurality of left leg interlocking means of said left legs of said front framework panel;

said another one of said plurality of front hinge slat interlocking means with said top one of said plurality of right leg interlocking means of said right leg of said front framework panel;

for said each one of said plurality of horizontal slats means, said one of said plurality of horizontal slat interlocking means with said one of said plurality of left leg interlocking means, and said another one of said plurality of horizontal slat interlocking means with said one of said plurality of right leg interlocking means; and said at least one pair of modular, latch arm means to said middle region of said rear framework panel and to said middle region of said front framework panel.

21. The method of claim 18, comprising the further steps of using a substantially identical configuration of interlocking components as said interlocking means for mating:

said one of said plurality of rear hinge slat interlocking means with said top one of said plurality of left leg interlocking means of said left leg of said rear framework panel;

said another one of said plurality of rear hinge slat interlocking means with said top one of said plurality of right leg interlocking means of said right leg of said rear framework panel;

said one of said plurality of front hinge slat interlocking means with said top one of said plurality of left leg interlocking means of said left legs of said front framework panel;

said another one of said plurality of front hinge slat interlocking means with said top one of said plurality of right leg interlocking means of said right leg of said front framework panel;

for said each one of said plurality of horizontal slats means, said one of said plurality of horizontal slat interlocking means with said one of said plurality of left leg interlocking means, said another one of said plurality of horizontal slat interlocking means with said one of said plurality of right leg interlocking means, and said at least one more of said plurality of horizontal slat interlocking means said one of said plurality of vertical slat interlocking means; and said at least one pair of modular, latch arm means to said middle region of said rear framework panel and to said middle region of said front framework panel.

22. The method of claim 16, further comprising the step of extending and adjusting heights of said respective legs and of said shrub shelter by:

mating at least four framework panel extender means, respectively, with bottoms of said left and right legs of said rear framework panel and bottoms of said left and right legs of said front framework panel.

23. The method of claim 19, further comprising the step of extending and adjusting heights of said respective legs and of said shrub shelter by:

mating at least four framework panel extender means, respectively, with bottoms of said left and right legs of said rear framework panel and bottoms of said left and right legs of said front framework panel.

24. The method of claim 16, further comprising the step of firmly anchoring said shrub shelter into a ground supporting said shrub shelter by:

mating at least four ground stakes with respective bottoms of said left and right legs of said rear framework panel and of said left and right legs of said front framework panel.

25. The method of claim 19, further comprising the step of firmly anchoring said shrub shelter into a ground supporting said shrub shelter by:

mating at least four ground stakes with respective bottoms of said left and right legs of said rear framework panel and of said left and right legs of said front framework panel.

26. The method of claim 16, comprising the further steps of adjusting the length of said latch arm means by:

slidably moving said bar lock means and said complementary bar lock receptacle means of at least one of said latch arm means relative to one another until a desired length is achieved, and then mating and interlocking together said at least one bar lock means and said at least one complementary bar lock receptacle means.

27. The method of claim 22, wherein said step of mating said at least four framework panel extender means, respectively, with bottoms of said left and right legs of said rear framework panel and bottoms of said left and right legs of said front framework panel, comprises the further steps of mating and interlocking at least one open-hole bar slot of each of said left legs and each of said right legs, with at least one leg extender bar lock receptacle means of said framework panel extender means.

28. The method of claim 23, wherein said step of mating said at least four framework panel extender means, respectively, with bottoms of said left and right legs of said rear framework panel and bottoms of said left and right legs of said front framework panel, comprises the further steps of mating and interlocking at least one open-hole bar slot of each of said left legs and each of said right legs, with at least one leg extender bar lock receptacle means of said framework panel extender means.

29. A method of assembling a shrub shelter solely from modular, interlocking components, without the use of hand tools, comprising the steps of:

providing as a modular hinge assembly, at least one elongated modular rear hinge slat and at least one elongated modular front hinge slat, integrally joined together with flexible hinge means fabricated from a strong, pliable material;

mating one of a plurality of rear hinge slat interlocking means of said at least one rear hinge slat with a top one of a plurality of leg interlocking means on a left rear one of at least four substantially-identical elongated modular legs;

mating another one of said plurality of rear hinge slat interlocking means with a top one of said plurality of leg interlocking means on a right rear one of said at least four substantially-identical elongated modular legs;

mating one of a plurality of front hinge slat interlocking means of said at least one front hinge slat with a top one of said plurality of leg interlocking means on a left front one of said at least four substantially-identical elongated modular legs;

mating another one of said plurality of front hinge slat interlocking means with a top one of said plurality of leg interlocking means on a right front one of said at least four substantially-identical elongated modular legs;

mating one of a plurality of latch arm interlocking means of a first one of at least one pair of modular, latch arm means with rear middle interlocking means of a middle region of said left rear leg;

mating another one of said plurality of latch arm interlocking means of said first one of said at least one pair of modular, latch arm means with rear middle interlocking means of a middle region of said right front leg;

mating one of said plurality of latch arm interlocking means of a second one of said at least one pair of modular, latch arm means with rear middle interlocking means of a middle region of said right rear leg;

mating another one of said plurality of latch arm interlocking means of said second one of said at least one pair of modular, latch arm means with rear middle interlocking means of a middle region of said left front;

forming a rear framework panel of said shrub shelter by: for each one of a rear group of a plurality of substantially-identical elongated modular horizontal slats with a plurality of horizontal slat interlocking means, mating one of said plurality of horizontal slat interlocking means with one of said leg interlocking means of said left rear leg, and another one of said plurality of horizontal slat interlocking means with one of said plurality of said leg interlocking means of said right rear leg; and forming a front framework panel of said shrub shelter by: for each one of a front group of a remainder of said plurality of horizontal slats, mating one of said plurality of horizontal slat interlocking means with one of said leg interlocking means of said left front leg, and another one of said plurality of horizontal slat interlocking means with one of said plurality of said leg interlocking means of said right front leg.

30. The method of claim 29, further comprising the steps of:

for any one of at least one substantially-identical elongated modular vertical slats with a plurality of vertical slat interlocking means to be included in said rear framework panel, for each one of said rear group of said plurality of horizontal slats, mating one said plurality of horizontal slat interlocking means with one of said plurality of vertical slat interlocking means; and for any one of said at least one vertical slats included in said front framework panel, for each one of said front group of said plurality of horizontal slats, mating one said plurality of horizontal slat interlocking means with one of said plurality of vertical slat interlocking means.

* * * * *